(No Model.)
J. DA S. SERTORI.
APPARATUS FOR THE TRANSMISSION OF POWER.
No. 252,529. Patented Jan. 17, 1882.
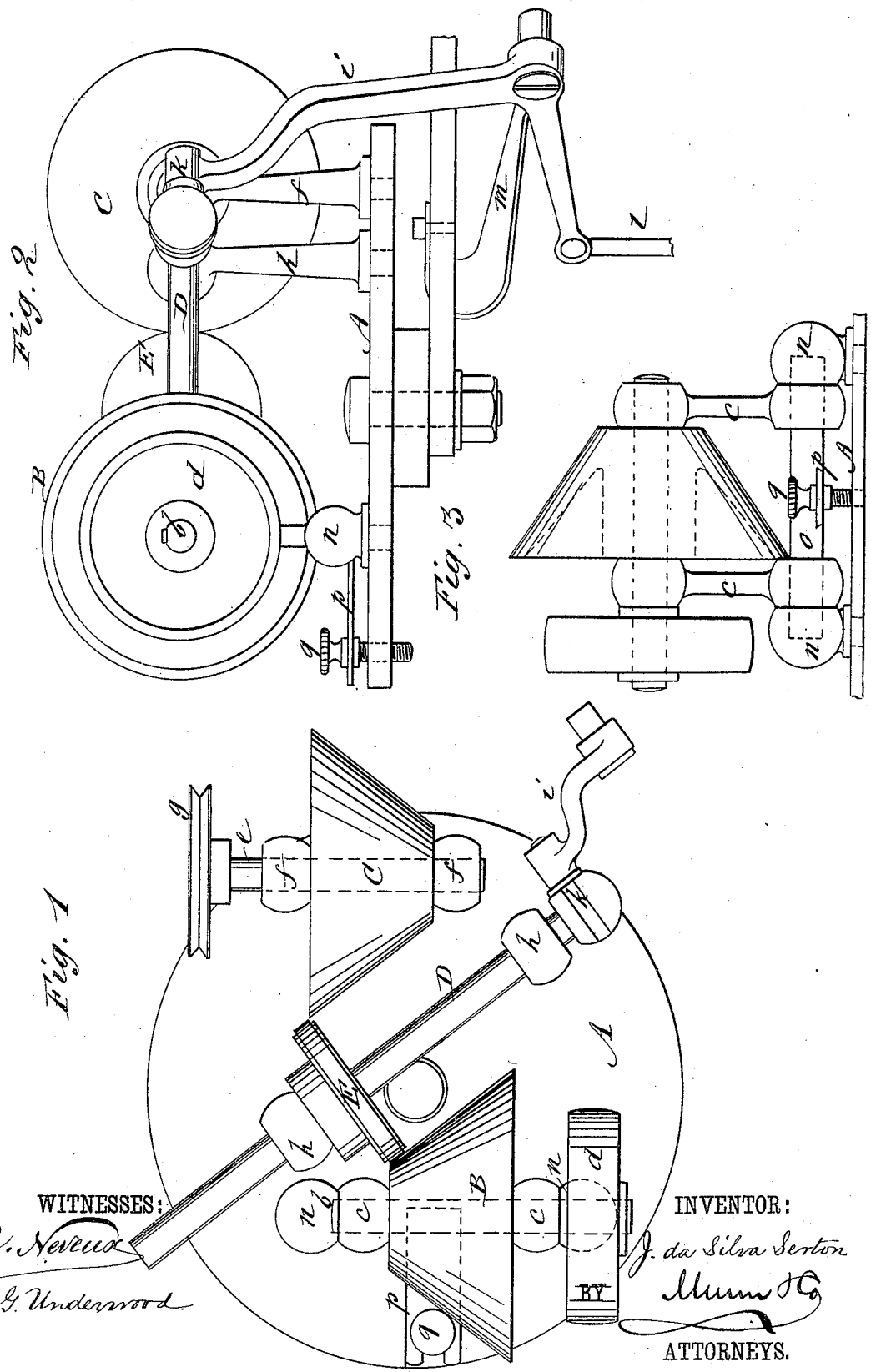

UNITED STATES PATENT OFFICE.

JOSE DA SILVA SERTORI, OF RIO DE JANEIRO, BRAZIL.

APPARATUS FOR THE TRANSMISSION OF POWER.

SPECIFICATION forming part of Letters Patent No. 252,529, dated January 17, 1882.

Application filed June 22, 1881. (No model.)

*To all whom it may concern:*

Be it known that I, JOSE DA SILVA SERTORI, of Rio de Janeiro, Brazil, have invented new and useful Improvements in Apparatus for the Transmission of Power, of which the following is a specification.

My improvements relate to devices for the transmission of power and regulation of speed, and are especially adapted for sewing-machines for obtaining variations of speed without shifting the driving-belt.

The invention consists in the combination of two cones and an intermediate friction-pulley, for operation as hereinafter described and claimed.

In the accompanying drawings, Figure 1 is a plan view of the mechanism. Fig. 2 is a side elevation of the same, and Fig. 3 is an elevation at right angles to Fig. 2.

Similar letters of reference indicate corresponding parts.

A is the supporting-plate of the mechanism.

B is a cone, fixed on a shaft, $b$, that is supported by posts $c$ $c$, on which shaft is also the pulley $d$, that receives the driving-belt.

C is a second cone, fixed on a shaft, $e$, that is sustained on posts $f$ at the side of and parallel to shaft $b$, and on the shaft $e$ is a pulley, $g$, that receives the belt by which the sewing or other machine is to be driven.

D is a shaft sustained in bearings on posts $h$ $h$ in a position between the cones B C and parallel to the contiguous faces thereof, and on this shaft is a friction-pulley, E, taking upon the cones B C, such pulley having a surface of rubber to insure perfect contact. The shaft D is capable of endwise movement, so as to vary the position of pulley E between the cones, and to effect the movement the shaft is connected at one end to a bent lever, $i$, by a rod, $k$, the rod being connected to a grooved boss on the shaft, so that the shaft is free to revolve. The lever $i$ connects with the rod $l$ of a foot-treadle, and a spring, $m$, connected to plate A and bearing on lever $i$, acts to retain the shaft in the position with the pulley E in contact with the smaller end of cone B.

In operation, the treadle being pressed down slightly, the pulley E is brought in contact with cone C at its larger end, and the revolutions of cone B are transmitted to cone C at a slower speed. To increase the speed the treadle will be pressed down farther, which carries the pulley E toward the larger end of the driving-cone and smaller end of the driven cone C. On release of the treadle, spring $m$ returns the pulley for reducing the speed or stopping the machine, as desired. To allow adjustment of cone B its posts $c$ are placed upon a shaft, $o$, which is pivoted in gudgeons $n$ $n$, and an arm, $p$, from the shaft is clamped to plate A by a screw, $q$. This allows the cone to be pressed on pulley E with the pressure required, and so retained by the screw $q$.

Having thus fully described my invention, I claim as new and desire to secure by Letters Patent—

1. In combination with the driving-cone B, cone C, shaft D, and pulley E, the bent lever $i$, rod $k$, connected to a grooved boss on shaft D, spring $m$, connected to plate A, and treadle-rod $l$, substantially as shown and described, for operation as set forth.

2. In apparatus for transmitting power, the posts $c$, shaft $o$, gudgeons $n$, arm $p$, and screw $q$, combined with the shaft of driving-cone B and intermediate pulley, E, substantially as and for the purposes set forth.

The above specification of my improvement in apparatus for the transmission of power signed by me this 9th day of April, 1881.

JOSE DA SILVA SERTORI. [L. S.]

Witnesses:
HORATIO SANVILLE,
EDWARD G. E. HEINE.